Figure 1:
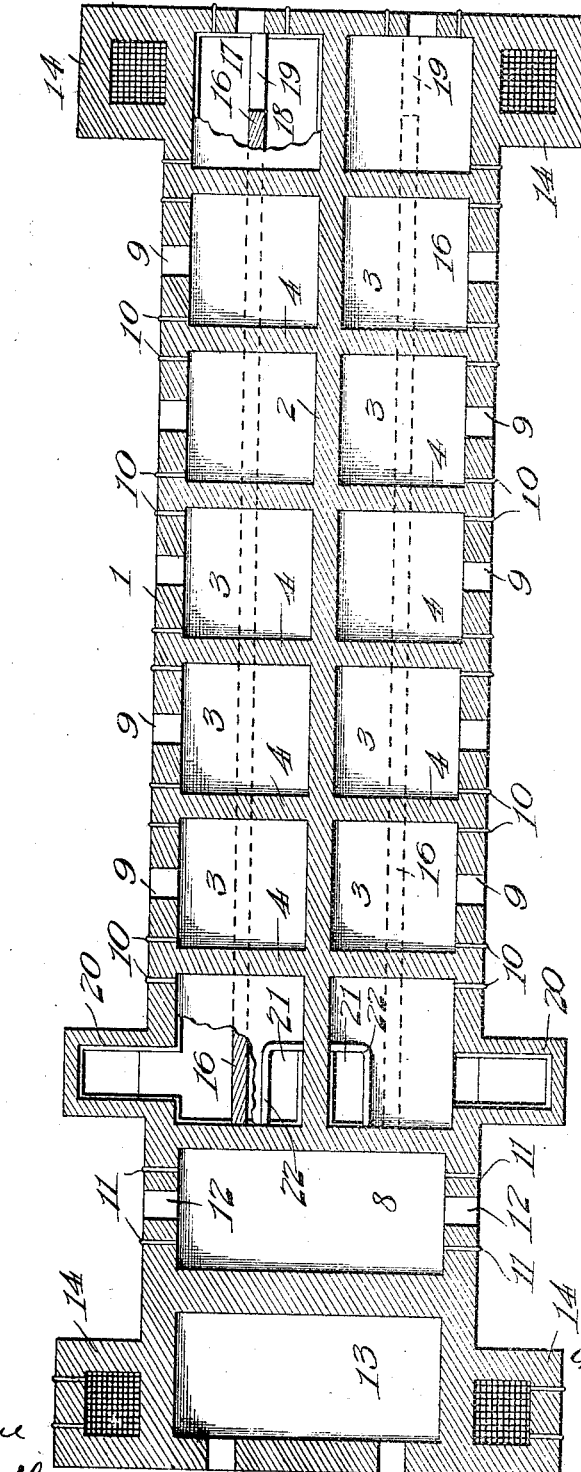

G. P. GIBSON.
SMELTING FURNACE.
APPLICATION FILED APR. 1, 1912.

1,032,599.

Patented July 16, 1912.
4 SHEETS—SHEET 1.

Witnesses

Inventor
George P. Gibson,

Attorney

G. P. GIBSON.
SMELTING FURNACE.
APPLICATION FILED APR. 1, 1912.
1,032,599.
Patented July 16, 1912.
4 SHEETS—SHEET 2.
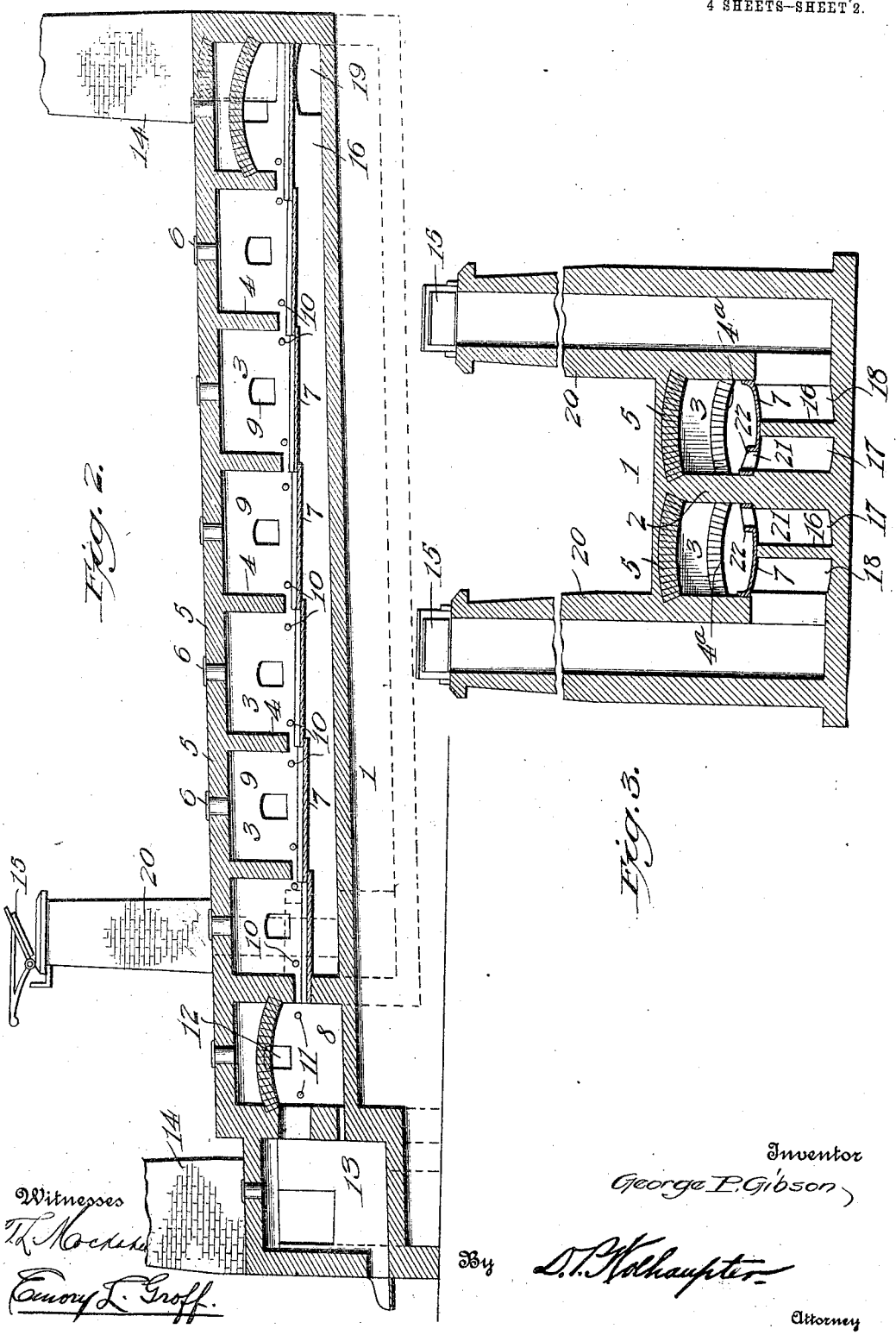

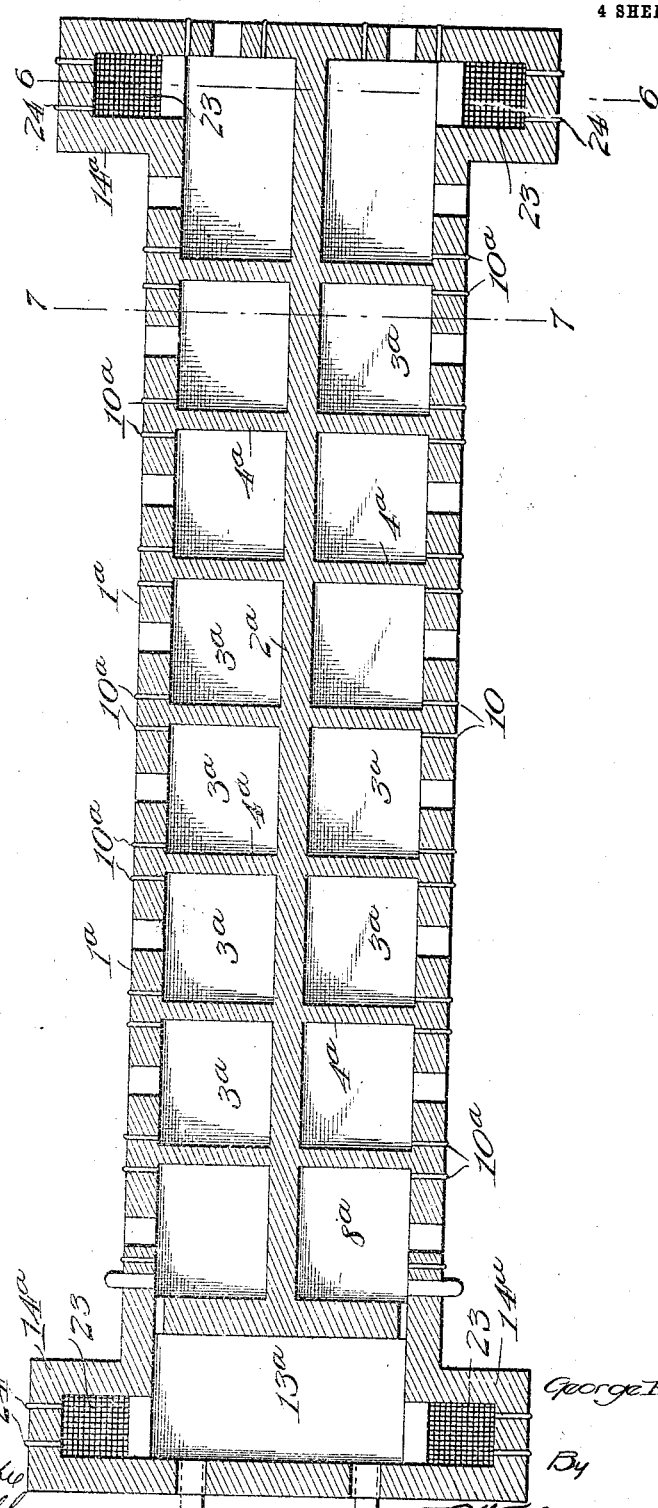

G. P. GIBSON.
SMELTING FURNACE.
APPLICATION FILED APR. 1, 1912.
1,032,599.
Patented July 16, 1912.
4 SHEETS—SHEET 4.
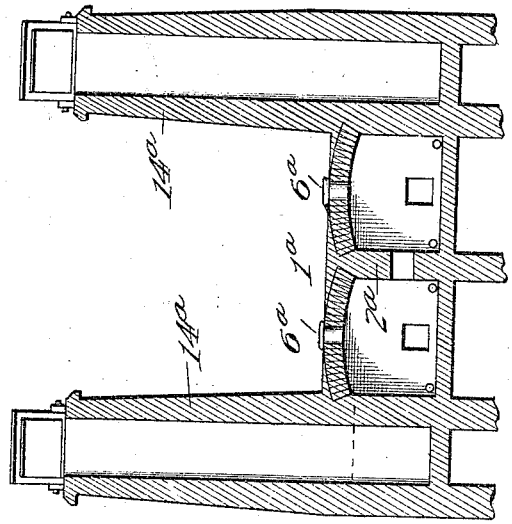
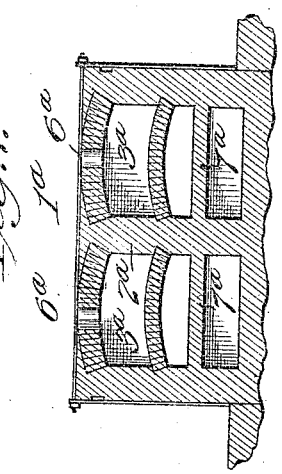
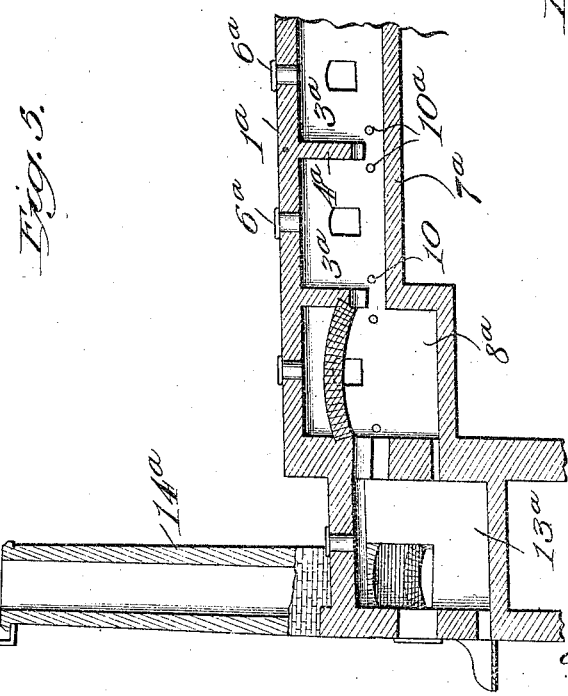
Witnesses
Inventor
George P. Gibson,
By
Attorney

UNITED STATES PATENT OFFICE.

GEORGE P. GIBSON, OF BRADDOCK, PENNSYLVANIA.

SMELTING-FURNACE.

1,032,599.  Specification of Letters Patent.  Patented July 16, 1912.

Application filed April 1, 1912. Serial No. 687,676.

*To all whom it may concern:*

Be it known that I, GEORGE P. GIBSON, a citizen of the United States, residing at Braddock, in the county of Allegheny and State of Pennsylvania, have invented certain new and useful Improvements in Smelting-Furnaces, of which the following is a specification.

This invention relates to certain new and useful improvements in the construction of smelting furnaces such as are employed for the smelting and reduction of ore, the furnace being more particularly designed for use in connection with iron ore.

Among the objects of the invention is to provide a smelting furnace which embodies novel features of construction, whereby the heat of combustion is utilized to the fullest possible extent in reducing and melting the ore, and whereby the direction and force of the draft can be readily regulated as may be necessary to produce the best results.

A further object of the invention is to provide a smelting furnace which is peculiarly constructed to admit of a series of comparatively small charges of ore and then to circulate the heat through the series of charges, so as to have a cumulative effect and act in a much more satisfactory and effective manner than is possible in the ordinary smelting furnace where a single large charge is treated and the heated products of combustion circulate upwardly through the charge and collect at the top and cooler portion thereof.

With these and other objects in view, the invention consists in certain combinations and arrangements of parts as will more fully appear as the description proceeds, the novel features thereof being pointed out in the claims.

For a full understanding of the invention, reference is to be had to the following description and accompanying drawings, in which—

Figure 1 is a horizontal sectional view through a smelting furnace constructed in accordance with the invention, portions of the floor being broken away to bring out more clearly the superheating or sub-flues which are arranged under the same. Fig. 2 is a vertical longitudinal sectional view through a series of charge receiving compartments upon one side thereof. Fig. 3 is a transverse vertical sectional view through the furnace, the said section being taken through the stacks which provide a draft for the superheating or sub-flues. Fig. 4 is a horizontal sectional view through a modified form of the invention. Fig. 5 is a longitudinal vertical sectional view through the discharge end of the modification shown in Fig. 4. Fig. 6 is a transverse vertical sectional view on the line 6—6 of Fig. 4. Fig. 7 is a transverse vertical sectional view on the line 7—7 of Fig. 4.

Like references designate corresponding parts in the several figures of the drawings.

Specifically describing the form of the invention illustrated by Figs. 1, 2, and 3 of the drawings, the numeral 1 designates the furnace body which preferably has an elongated formation and may be constructed of brick or other suitable material. A longitudinal partition 2 extends through the furnace 1, and a series of charge receiving compartments 3 are arranged upon each side of the partition 2. These charge receiving compartments 3 are separated from each other by a transversely disposed wall 4, the said walls being arched at their lower ends as at 4ª, so that the compartments 3 of each series are in communication with each other at the bottom thereof. The various compartments are provided with the tops 5 having the charge openings 6 therein.

All of the charge receiving compartments 3 have common thereto, a sectional inclined bottom which is formed of crucible steel sections 7, and constitutes the melting floor. The various melting floor sections are all inclined toward one end of the furnace so as to discharge into a primary receiving pit 8. It will be observed that the melting floor sections 7 are depressed transversely so as to provide a longitudinal channel through which the molten metal can flow. It will also be observed that the ends of the adjacent melting floor sections 7 overlap each other so as to prevent leakage of the molten metal and avoid the necessity of a complicated joint. The side walls of the furnace 1 are formed with inspection openings 9 for the various compartments 3, the said openings being normally closed, but enabling the operator to inspect the charge in any one of the compartments at any time to ascertain whether or not the furnace is working properly at that point.

One or more burners or equivalent heating means are provided for each of the charge receiving compartments 3, and in the present instance a pair of oil burners 10 are shown as projecting through the walls of the furnace into each of the said compartments. When these burners 10 are in operation, the heated products of combustion which tend to rise into the upper part of the compartments 3, are caused by the draft of the stacks to be drawn downwardly beneath the arches 4ª from one compartment to the other, and hence over and through the charges of ore. In their exit from the furnace the said products of combustion are drawn through a series of the charge receiving compartments so as to have cumulative effect and act upon the ore in a very satisfactory manner. The ore is supplied to the various compartments through the charge openings 6 in the roof or tops thereof, although under normal conditions care is exercised not to overchange any one of the compartments, since this would tend to shut off the circulation of air and to choke the same. The molten metal and slag accumulating at the bottom of the compartments will be carried to the primary receiving pit 8 by the inclined melting floor.

The primary receiving pit 8 may be heated by means of burners 11, and a suitable opening 12 is provided for running off the slag which will float on top of the metal. From the primary receiving pit 8, the molten metal flows into a main storage chamber 13 from which it may be removed for use.

A pair of stacks 14 are arranged at each end of the furnace so as to be in communication with the interior thereof. Each of these stacks is provided with a controlling valve 15 (see Figs. 2 and 3) and by properly adjusting these valves and choking one of the compartments as presently explained the draft through the furnace can be switched around and controlled in the desired manner. When the controlling valves of the stacks at one end of the furnace are open, the controlling valves of the stacks at the opposite end of the furnace will ordinarily be closed, thereby causing the products of combustion to circulate downwardly through the charges in the various compartments 3 and to then pass through the lower portions of all of the compartments intervening between the respective compartment and the stack which is open. The force or intensity of the draft may also be regulated, since it will be obvious that when both stacks are open, there will be a stronger draft than when only one of the stacks is open. The peculiar arrangement and relation existing between the compartments and the stacks also admits of the draft through the compartments being controlled in a different manner. For instance, should it be found that one or more of the charge receiving compartments 3 were not working properly, one compartment could be readily choked and put out of commission by supplying an over charge of ore thereto. The choking of this particular compartment 3 would interrupt the circulation through the series of compartments on that side of the furnace, and should this compartment be at the middle portion of the furnace, it would be necessary for the products of combustion to circulate through the other compartments in opposite directions from the choked compartment. With the stacks 14 at one end of the furnace closed, the products of combustion from the compartments on one side of the choked compartment would pass up the open stacks in the usual manner, while the products of combustion in the compartments 3 on the opposite side of the choked compartment would necessarily be forced to circulate around the end of the longitudinal partition 2 and through all of the compartments 3 on the opposite side of the said partition before entering the open stacks. The cumulative effect of the heating becomes greater as the number of compartments through which the products of combustion are caused to circulate increases, and by cutting off or choking a selected compartment, as above set forth, the operation of the furnace can be regulated so as to produce the most effective results.

In the construction shown in Figs. 1, 2 and 3, superheating or sub-flues are arranged under the melting floors 7 for the purpose of heating the said melting floors from the bottom thereof. This is particularly advantageous in that it results in the melting of what is known as the downcomer dust, this being the metal dust which is blown out of the blast furnace and which is now carefully recovered for subsequent use. The space under the melting floors 7 of each series of compartments 3 is subdivided by a partition 16 into a pair of longitudinal flues 17 and 18. These flues 17 and 18 communicate with each other at one end of the furnace through opening 19 in the partition 16, the opposite end of each of the outer flues 18 communicating with a stack 20, while the opposite end of each of the inner flues 17 communicates with the interior of the furnace through an opening 21 formed at one side of one of the melting floors 7 at a point adjacent the primary receiving pit 8. In the operation of the furnace, as previously described, the molten metal which may collect upon the melting floors 7 will cut its way through the various ore charges and flow into the primary receiving pit 8, heated products of combustion simultaneously circulating through the various compartments under the transverse walls 4 toward the open stacks 14. A portion of the products of combustion will escape through the open stacks, while another portion of the said products of combustion will pass downwardly through the opening 21 in the melting floor and enter the inner superheating or sub-flue 17. The draft or suction produced by the stack 20 will draw the products of combustion rearwardly through the inner sub-flue 17 where they will pass through the opening 19 into the outer flue 18 and circulate forwardly through the said outer flue to the stack. These products of combustion circulating under the melting floors 7 assist in keeping the said melting floors at a high temperature so as to effectively melt downcomer dust. In order to prevent the molten metal from passing through the opening 21 in the floor, this opening is preferably surrounded by an upstanding flange 22, the said flange permitting the heated products to pass freely through the opening, while the molten metal is caused to flow around the opening and be discharged into the primary receiving pit 8.

A modification of the invention is illustrated by Figs. 4, 5, 6, and 7 of the drawings. This modification is substantially the same as the construction previously described, with the exception that the superheating or sub-flues under the melting floors are eliminated, together with the intermediate stacks for producing a draft through the sub-flues. The numeral 1ª designates the body portion of the modified construction of furnace, the said furnace being provided with a longitudinal partition 2ª having a series of charge receiving compartments 3ª on each side thereof, the said compartments 3ª being separated by the transversely disposed arched walls 4ª. These compartments 3ª are provided with burners 10ª and are adapted to receive the charges of ore through charge openings 6ª in the tops thereof. The melting floor 7ª, instead of being formed of crucible steel, as in the previous instance, may be formed of brick or masonry, the floor for each series of compartments being continuous and inclined downwardly toward the primary receiving pit 8ª. As in the previous instance, from this primary receiving pit 8ª the molten metal will flow into a main storage pit 13ª, from which it may be withdrawn as desired. Stacks 14ª are provided at opposite ends of the furnace 1ª, exactly as per the previous instance, to create and control the draft through the furnace. These stacks 14ª are preferably constructed with checker work 23 and provided with burners 24. This checker work 23 becomes highly heated in the operation of the furnace, and should the direction of draft be reversed, the air entering the furnace through the checker work construction would be initially heated. The burners 24 are also employed to heat the checker work, air inlets being provided at points where the burners enter the stacks, so that even when the controlling valves of the stacks are closed, air can enter the stacks and pass downwardly through the heated checker work construction into the furnace to aid in the process of smelting.

I claim:

1. A smelting furnace including a series of charge receiving compartments formed with a continuous melting floor, independent burners for the various compartments, means for producing a draft through the various compartments, means for collecting the molten metal from the melting floor, and a heating flue arranged under the melting floor.

2. A smelting furnace including a series of charge receiving compartments formed with a common melting floor, and communicating with each other at the bottom thereof, independent heating means for the various compartments, means for forcing the products of combustion to circulate downwardly through the individual compartments and through the bottom of the series of compartments, and means for collecting the molten metal from the melting floor.

3. A smelting furnace including a series of charge receiving compartments formed with a continuous inclined melting floor extending under all of the compartments, the said compartments being separated by walls terminating above the inclined melting floor, a burner for each of the compartments, means for collecting the molten metal from the melting floor, and means for causing the products of combustion to circulate downwardly through the various compartments and under the dividing walls between the compartments.

4. A smelting furnace including a series of charge receiving compartments formed with a continuous melting floor extending under all of the compartments, the said compartments being separated by walls which terminate above the melting floor, a receiving pit for collecting the molten metal from the melting floor, and a stack for producing a draft, the products of combustion circulating downwardly through the different compartments and under the dividing walls between the compartments.

5. A smelting furnace including a series of charge receiving compartments formed with a continuous melting floor extending under all of the compartments, a burner for each of the compartments, a pit for receiving the molten metal from the melting floor, stacks at opposite ends of the series of compartments, and controlling valves for the stacks.

6. A smelting furnace including a series of charge receiving compartments provided with a continuous melting floor which extends under all of the compartments and is inclined toward one end of the furnace, a burner for each of the compartments, a primary receiving pit into which the molten metal is discharged from the inclined melting floor, means for withdrawing the slag from the primary receiving pit, a storage chamber adapted to receive the molten metal from the primary receiving pit, and means for producing a draft through the furnace.

7. A smelting furnace including a series of charge receiving compartments provided with a continuous inclined melting floor extending under all of the compartments, the said compartments communicating with each other at the bottom thereof, a burner for each of the compartments, a primary receiving pit into which the molten metal is discharged from the melting floor, means for withdrawing the slag from the primary receiving pit, a main storage chamber adapted to receive the metal from the primary receiving pit, stacks at opposite ends of the series of compartments for producing a draft through the compartments in either direction, and controlling valves for the stacks, the products of combustion circulating downwardly through the individual charge receiving compartments and then passing through a series of compartments at the bottom thereof.

8. A smelting furnace including a series of charge receiving compartments provided with a continuous melting floor, a burner for each of the compartments, a receiving pit for collecting the molten metal from the melting floor, a heating flue arranged under the melting floor, the said melting floor having an opening therein through which one end of the heating flue communicates with the interior of the furnace, and a stack in communication with the opposite end of the heating flue.

In testimony whereof I hereunto affix my signature in the presence of two witnesses.

GEO. P. GIBSON.

Witnesses:
E. H. McLachlen,
Emory L. Groff.

---

Copies of this patent may be obtained for five cents each, by addressing the "Commissioner of Patents, Washington, D. C."